April 16, 1946.  P. E. PROVINCE  2,398,459

ROLLER BEARING

Filed Feb. 7, 1944

PAUL E PROVINCE
       INVENTOR
By F. E. Shannon
   ATTORNEY

Patented Apr. 16, 1946

2,398,459

UNITED STATES PATENT OFFICE 2,398,459

ROLLER BEARING

Paul E. Province, Kent, Ohio

Application February 7, 1944, Serial No. 521,355

3 Claims. (Cl. 308—214)

This invention relates to improvements in roller bearings, and while intended for general use, it is particularly designed for use in connection with heavy machinery.

Objects of the invention are to provide a roller bearing employing two sets of tapered rollers mounted in oppositely tapered raceways, each formed of an inner bearing cone, and an outer bearing cup and to provide an improved ball bearing mounted for the axial end of each roller to reduce friction resulting from thrust loads and to provide a new arrangement and assembly of parts which can be economically manufactured and assembled to form a highly efficient bearing.

The above objects are accomplished and other ends attained by the combination and arrangement of elements hereinafter described with reference to the accompanying drawing in which there is shown an illustrative embodiment of the invention, it being understood that the invention is not confined to the exact form illustrated and that changes and modifications may be made which come within the scope of the claims hereinafter set forth.

Figure 1:
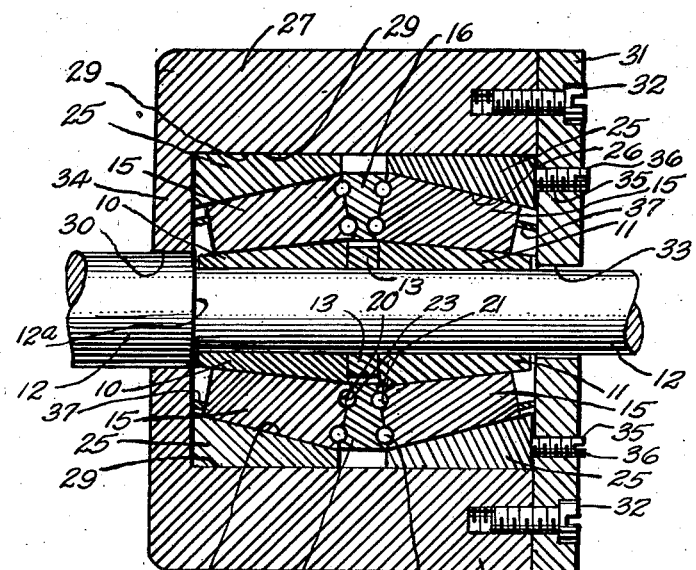
Figure 1 is a central longitudinal sectional view of a bearing constructed in accordance with this invention.
Figure 2:
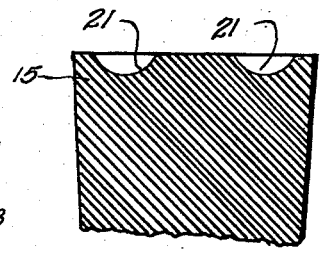
Figure 2 is a fragmentary central longitudinal sectional view showing one end portion of one of the rollers employed in reducing the invention to practice.
Figure 3:
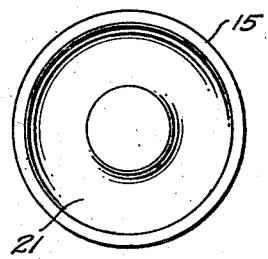
Figure 3 is an end elevational view of same.

In the particular adaptation of the invention shown, the numerals 10 and 11 denote inner cones or bearing sleeves which are mounted on the shaft 12 and secured thereto by the key 9 or any suitable fastening means, with the bases of the cones presented toward each other to form inner raceway surfaces. A spacing band 13 is positioned on the shaft 12 between the cones 10 and 11. The spacing band 13 is smaller in outside diameter than the base of the cones 10 and 11. In some types of bearings the cones 10 and 11 and the band 13 may be formed of one piece of material.

The numeral 15 denotes tapered rollers a circumferentially extending set of which are mounted on each bearing cone 10 or 11 with the larger ends of the rollers 15 in each set presented toward the rollers in the other set. A ring 16 is positioned in spaced concentric relation around the spacer band 13 and between the sets of rollers 15. The ring 16 is provided on each axial face thereof with a circumferentially extending series of spaced circular seats 17, one for each roller 15. The bottom wall 18 of each seat 17 is disposed at a right angle to the axis of the adjacent roller 15.

The bottom wall 18 of each seat 17 is provided with an annular groove 20 of rounded cross-section. The axial end of each roller 15 is likewise provided with a concentrically arranged annular groove 21 which is of the same size and cross-section as the groove 20. The rollers 15 are positioned on the cones 10 and 11 with the grooves 21 in each roller coinciding with a groove 20 in the ring 16 and balls 23 are interposed and roll in each of the raceways thus formed.

A cup or bearing ring 25 having an inner circumferential face forming an outer conical raceway surface 26 is positioned around each set of rollers 15 and a bearing retainer or hub 27 surrounds the assembly above described. In the drawing there is shown a retainer 27 having a cylindrical cavity 29 formed to snugly receive the outer bearing rings 25. The retainer 27 is provided with an integrally formed axial wall 34 having a centrally positioned bore 30 for receiving the shaft 12. A plate 31 is secured to the other axial face of the retainer 27 to close the cavity 29 by the bolts 32 or other suitable means. The plate 31 is provided with a centrally positioned bore 33 in which the shaft 12 is received. In the adaptation of the invention shown in the drawing the shaft 12 is provided with a shoulder 12a which butts against the adjacent inner bearing cone 10 and the cone 11 terminates in spaced relation to the cover plate 31 thus permitting free rotation of the hub 27.

The outwardly presented axial ends of the rollers 15 in each set terminate in spaced relation to the wall 34 or plate 31. The plate 31 is provided with a plurality of threaded bores 35 in each of which is mounted an adjusting screw 36 which is positioned to be operated against the adjacent bearing 25 to take up play and properly adjust the rollers 15 in said raceways.

While any suitable cage or other means may be employed to hold the rollers 15 in spaced relation in the drawing, there is shown a conical cup 37 shaped to conform with the outer raceway surface 26. The cups 37 are slotted from the inwardly presented ends thereof to form fingers 37a which terminate in spaced relation to the enlarged ends of the rollers 15.

Figure 4:
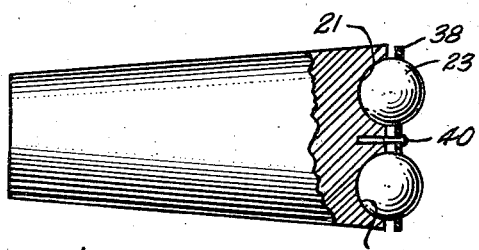
Figure 4 is a side elevational view partly in longitudinal section showing one of the rollers fitted with one form of ball retainers which may be employed in carrying out the invention.
Figure 5:
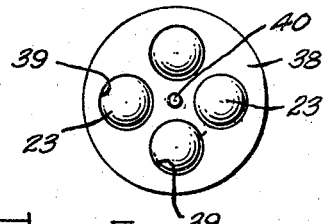
Figure 5 is an end elevational view of same.
Figure 6:
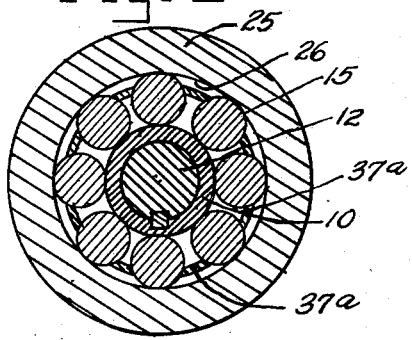
Figure 6 is a cross-sectional view taken as indicated by the line 6—6 of Figure 1.
Figure 7:
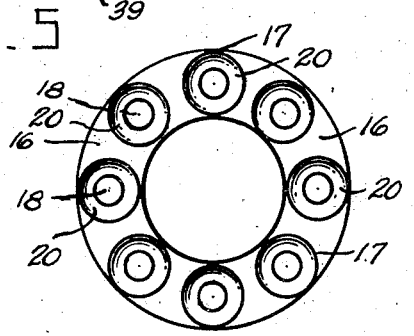
Figure 7 is plan view showing an axial face of the bearing ring.

In Figures 4 and 5 there is shown a ball retainer for securing the balls 23 in the grooves 21 of each roller 15 which consists of a disk 38 having circumferentially spaced bores 39 of smaller diameter than the balls 23. The disk 38 is secured to the axial end of the roller by a bolt 40 which is threaded in a suitable bore in each roller 15 as shown in Figures 4 and 5.

The annular grooves 20 and 21 are preferably formed on a radius slightly larger than the radius of the balls 23.

Having thus illustrated my invention and described the same in detail, what I claim and desire to secure by Letters Patent is:

1. A roller bearing including an inner sleeve provided with a pair of oppositely tapered inner conical raceway surfaces arranged with the bases of said conical surfaces presented toward each other, outer sleeves providing a pair of oppositely tapered outer raceway surfaces, each set of sleeves forming roller raceways, a set of tapered roller bearings interposed in each set of raceways with the large ends thereof inwardly, a ring mounted in coaxial relation between said raceways to receive the inner axial ends of both sets of rollers, and a ball bearing operatively mounted between the inwardly presented end of each roller and said ring, said ball bearing comprising a plate pivotally connected to the large end of each of said rollers, said plate being provided with apertures for receiving said balls to project therethrough.

2. A roller bearing including an inner sleeve provided with a pair of oppositely tapered inner conical raceway surfaces arranged with the bases of said conical surfaces presented toward each other, outer sleeves providing a pair of oppositely tapered outer raceway surfaces, each set of sleeves forming roller raceways, a set of tapered roller bearings interposed in each set of raceways with the large ends thereof inwardly, a ring mounted in coaxial relation between said raceways to receive the inner axial ends of both sets of rollers, and a ball bearing operatively mounted between the inwardly presented end of each roller and said ring, said ball bearing comprising a plate pivotally connected to the large end of each of said rollers, said plate being provided with apertures for receiving said balls to project therethrough, the apertures of said plate being smaller than the diameter of said balls for retaining the balls in cooperation with the roller thereof.

3. In a roller bearing tapered inner and outer concentrically arranged bearing rings forming a raceway, tapered rollers interposed in said raceway, a ring positioned to receive the axial thrust from said rollers, said ring revolvable with the rollers and a ball bearing between each roller and said ring, each of said ball bearings including a ball retaining member pivotally connected to its roller, said rollers and said ring having concentric annular grooves to provide ball raceways for said ball bearings.

PAUL E. PROVINCE.